3,134,790
CYCLOPENTENE DERIVATIVES OF THE ANDROSTENE, α-ANDROSTANE AND β-ANDROSTANE SERIES AND PROCESS FOR THEIR MANUFACTURE
Werner Fritsch, Neuenhain, Taunus, and Erhard Daase, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed June 9, 1961, Ser. No. 115,893
Claims priority, application Germany June 11, 1960
8 Claims. (Cl. 260—397.3)

The present invention relates to $\Delta^{4'}$-cyclopenteno-(1',2':16,17)-derivatives of the androstene, 5α-androstane- and 5β-androstane series of the formula

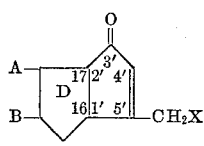

wherein X represents a hydrogen atom or a hydroxy group which may be acylated, A and B in conjunction with the nucleus D represent any desired steroid radical.

The present invention likewise relates to pharmaceutical preparations containing the compounds of the above-mentioned formula as active ingredients in addition to the usual pharmaceutical carrier substance and/or stabilizers.

The present invention finally relates to the preparation of these compounds by treating with a basic condensing agent a 16-acetyl-20-keto-derivative or a 16-hydroxy-acetyl-20-keto-derivative or a 16-acyl-hydroxy-acetyl-20-keto derivative of the pregnene, pregnane or allopregnane series that might contain in addition to the keto group in 20-position further hydroxy and/or keto groups and in which a hydroxy group in 3-position may likewise be acylated.

When starting from a 16-acetyl-3,20-keto derivative or a 16-hydroxy-acetyl-20-keto-3β-ol derivative of the pregnene series, the reaction proceeds according to the following scheme:

As starting substances for the process according to the invention the following compounds may be used: 16-acetyl - $\Delta^5$ - pregene-3β-ol-20-one, 16-acetyl-$\Delta^4$-pregnene-3,20 - dione, 16-acetyl-pregnane-3,20-dione, 16-acetyl-allopregnane-3,20-dione. Furthermore, the corresponding 16-acyloxyacetyl-20-keto-derivatives of the pregnene-, pregnane or allopregnane series are suitable, of which, in particular, 16 - hydroxy-acetyl-$\Delta^5$-pregnene-3β-ol-20-one-diformiate and 16-hydroxy-acetyl-$\Delta^5$-pregnene-3β-ol-20-one-dibenzoate are mentioned.

The starting substances may be obtained, for instance, from the corresponding 3-acyloxy-16-carboxylic acid halides by reaction with diazo-ketone, by treating the diazo-ketones obtained with hydrogen halide and subjecting them to acid hydrolysis or reacting them with carboxylic acids.

The ring closure reaction for the formation of the corresponding derivatives of the 16,17-cyclopenteno-androstene series is suitably carried out in the presence of a strongly basic condensing agent and by using an appropriate solvent or distributing agent, at temperatures between 0 and 100° C., favorably at the boiling temperature of the solvent used in each case. With medium sized batches the reaction is terminated, in general, after about 2 hours. As basic condensing agent there may be used, for example, alkali metal hydroxides, such as sodium or potassium hydroxides, alkali metal carbonates or alkali metal alcoholates, for instance, sodium ethylate. As solvents there are suitable alcohols or ketones as well as other organic solvents miscible with water. It is of advantage to use low molecular alcohols such as methanol or ethanol.

The structure of the 16-acetyl-20-keto-derivatives or the 16-hydroxy-acetyl-20-keto-derivatives of the above-mentioned steroid series has practically no influence on the success of the reaction, i.e. the steroids used may carry, for instance, in 3-position a hydroxy- or keto group, the ring A may be saturated or unsaturated, and the number of the double linkages may vary. As already mentioned, the steroids used may, furthermore, contain other hydroxy and/or keto groups in the steroid structure. Acylated hydroxy groups present in 3-position are subjected to hydrolysis in the course of the reaction.

If the products of the invention contain in 3-position hydroxy or acyloxy groups, the latter may be converted

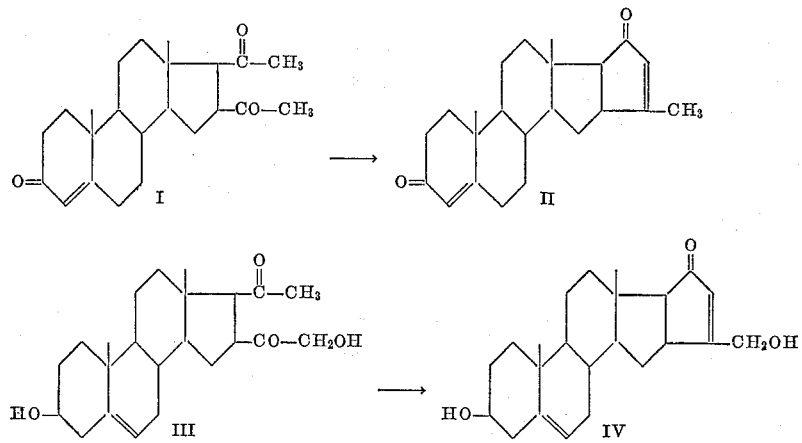

The introduction of further hydroxy and/or keto groups or their conversion may be carried out prior to or after the described ring closure reaction took place.

Further substituents that may be present in the steroid nucleus, such as methyl groups in 2- and/or 6-position or halogens such as fluorine in 6- or 9-position, or hydroxy or keto groups in 11-position do not affect the course of the reaction according to the invention.

into the corresponding 3-keto-derivatives under the conditions of the Oppenauer oxidation. For this purpose, the products of the invention are suitably reacted in an inert solvent, for instance, benzene, xylene or advantageously, toluene, with an aluminum alcoholate such as aluminum isopropylate or -butylate, and in the presence of ketones, for instance acetone or cyclohexanone. As reaction temperature there is suitably chosen the boiling temperature of the solvent used. In general, the Oppenauer reaction occurs very quickly and is terminated, with small batches, in most cases after about one hour.

The products obtained are new compounds containing the hitherto unknown basic structure of a cyclopenteno-androstene with the pharmacologically interesting grouping of an $\alpha$-$\beta$-unsaturated ketone. The compounds are valuable medicaments which, apart from their antialdosterone efficiency exhibit, in particular, diuretic properties, viz. no increased excretion of sodium and moderate retention of potassium in comparison with control animals treated with desoxycorticosterone.

The products of the invention may be used as such or in the form of pharmaceutical preparations such as oily suspensions, crystalline suspensions, or in the form of solutions, capsules or tablets, by oral or parenteral application.

The following examples serve to illustrate the invention but they are not intended to limit it thereto:

EXAMPLE 1

*5'-Methyl-3'-Keto-$\Delta^{4'}$-Cyclopenteno-(1',2':16,17)-$\Delta^4$-Androstene-3-One*

(a) 8 grams of 16-acetyl-$\Delta^5$-pregnene-3$\beta$-ol-20-one-3-formiate are dissolved in 200 cc. of methanol and a solution of 8 grams of potassium hydroxide in 30 cc. of water is added. After boiling for 2 hours one third of the solvent is distilled off under reduced pressure, and the residue is stirred into 1000 cc. of water. It is acidified by means of dilute hydrochloric acid and colorless crystals are filtered off with suction. There are obtained 7 grams of 5'-methyl-3'-keto-$\Delta^{4'}$-cyclopenteno-(1',2':16,17)-$\Delta^5$-androstene-3$\beta$-ol of a melting point of 228–230° C. The ultraviolet spectrum (max.)=234 m$\mu$ (in methanol).

($b_1$) 1 gram of 16-acetyl-$\Delta^5$-pregnene-3$\beta$-ol-20-one is dissolved in 10 cc. of methanol and heated to boiling for 30 minutes under reflux with 3 cc. of a sodium methylate solution containing 69 grams of sodium per cc. The reaction mixture is then diluted with water and acidified with dilute hydrochloric acid. There is obtained 0.8 gram of a compound showing a melting point of 190° C., which after recrystallization from acetone melts at 230° C. A sample of the substance with the compound prepared according to Example 1 shows no depression of the melting point.

($b_2$) 6.3 grams of 5'-methyl-3'-keto-$\Delta^{4'}$-cyclopenteno-(1',2':16,17)-$\Delta^5$-androstene-3$\beta$-ol (obtained as described in Examples 1a and 1b) are dissolved in 200 cc. of toluene and 60 cc. of cyclohexanone and 30 cc. of the mixture of solvents is distilled off. After addition of 10 grams of freshly distilled aluminum isopropylate in 50 cc. of toluene the mixture is heated to the boil for 1 hour under reflux. It is then distilled by means of steam until clear water passes over. The aqueous suspension is evaporated to dryness under reduced pressure and the residue is extracted three times with 200 cc. of the acetone each time and three times with 200 cc. of methylene chloride each time. After evaporation of the solvent, 5.1 grams of the product showing a melting point of 245° C. (Kofler heater) are obtained, which with the compound obtained according to example 2 does not give rise to a depression of the melting point.

EXAMPLE 2

*5'-Methyl-3'-Keto-$\Delta^{4'}$-Cyclopenteno-(1',2':16,17)-$\Delta^4$-Androstene-3-One*

Starting from 16-acetyl-$\Delta^4$-pregnene-3,20-dione: 2 grams of 16-acetyl-$\Delta^4$-pregnene-3,20-dione having a melting point of 172° C. are dissolved in 60 cc. of methanol and a solution of 2 grams of potassium hydroxide in 10 cc. of water are added. After boiling for 30 minutes under reflux the solution is cooled. The reaction mixture is acidified with 2 N-hydrochloric acid and stirred into 300 cc. of water. 1.7 grams of 5'-methyl-3'-keto-$\Delta^{4'}$-cyclopenteno - (1',2':16,17)-$\Delta^4$-androstene-3-one of a melting point of 200° C. are obtained which, after recrystallization from acetone show a melting point of 236–238° C. (on the Kofler heater=245° C.). The ultraviolet spectrum (max.)=237.5 m$\mu$ (in methanol).

EXAMPLE 3

*5'-Methyl-3'-Keto-$\Delta^{4'}$-Cyclopenteno-(1',2':16,17)-5$\alpha$-Androstane-3-One*

5 grams of 16-acetyl-5$\alpha$-pregnane-3,20-dione are dissolved in 200 cc. of methanol, 5 grams of potassium hydroxide in 50 cc. of water are added and heated to the boil for 1 hour under reflux. The mixture is then acidified with 2 N-hydrochloric acid, and the reaction mixture is stirred into 1 liter of cold water. After filtering with suction there are obtained 4.2 grams of 5'-methyl-3'-keto-$\Delta^{4'}$ - cyclopenteno - (1',2':16,17)-5$\alpha$-androstane-3-one of a melting point of 220° C. After recrystallization in acetone at 220–230° C. the compound melts at 220–230° C. The ultraviolet spectrum (max)=234 m$\mu$ (in methanol).

EXAMPLE 4

*5'-Hydroxy-Methyl-3'-Keto-$\Delta^{4'}$-Cyclopenteno-(1',2':16, 17)-$\Delta^5$-Androstene-3$\beta$-Ol*

9.7 grams of 16-hydroxy-acetyl-$\Delta^5$-pregnene-3$\beta$-ol-20-one-dibenzoate are dissolved in 300 cc. of absolute methanol and 100 cc. of sodium methylate solution are added. The batch is heated for 30 minutes under reflux and under an atmosphere of nitrogen. After cooling, the reaction mixture is acidified with 2 N-hydrochloric acid and stirred into 1.2 l. of water. The suspension is rendered alkaline by means of saturated sodium bicarbonate solution, and the brown substance is filtered off with suction. There are obtained 5.7 grams of 5'-hydroxy-methyl - 3' - keto - $\Delta^{4'}$ - cyclopenteno - (1',2':16,17) - $\Delta^5$ - androstene-3$\beta$-ol of a melting point of 180° C. After recrystallization from acetone the compound melts at 245° C. The melting point defined on the Kofler heater amounts to 252° C.

EXAMPLE 5

(a) *5'-Hydroxy-Methyl-3'-Keto-$\Delta^{4'}$-Cyclopenteno-(1',2':16,17)-$\Delta^4$-Androstene-3-One*

8.5 grams of 16-hydroxy-acetyl-$\Delta^4$-pregnene-3,20-dione-acetate are dissolved in 200 cc. of methanol and 60 cc. of a 3 N-sodium methylate solution are added. The reaction mixture is heated under reflux for 1.5 hours. It is then neutralized by means of acetic acid and stirred into water. There are obtained 6.4 grams of 5'-hydroxy-methyl - 3'-keto-$\Delta^{4'}$-cyclopenteno-(1',2':16,17)-$\Delta^4$-androstene-3-one in the form of a colorless substance which after recrystallization from acetone melts at 275° C.

(b) *5'-Hydroxy-Methyl-3'-Keto-$\Delta^{4'}$-Cyclopento-(1',2':16,17)-$\Delta^4$-Androstene-3-One-Acetate*

3 grams of 5-hydroxy-methyl-3'-keto-$\Delta^{4'}$-cyclopento-(1',2':16.17)-$\Delta^4$-androstene-3-one are dissolved in 30 cc. of pyridine and 10 cc. of acetanhydride are added while cooling with ice. After standing over night the mixture is diluted with water and then acidified by means of semi-concentrated hydrochloric acid. There are obtained 2.9 grams of 5'-hydroxy-methyl-3'-keto-$\Delta^{4'}$-cyclopenteno-(1', 2':16,17)-$\Delta^4$-androstene-3-one-acetate of a melting point of 181–185° C.

(c) *5'-Hydroxy-Methyl-3'-Keto-$\Delta^{4'}$-Cyclopenteno-(1',2':16,17)-$\Delta^4$-Androstene-3-One-Mesylate*

600 milligrams of 5'-hydroxy-methyl-3'-keto-$\Delta^{4'}$-cyclopenteno-(1',2':16,17)-$\Delta^4$-androstene-3-one are dissolved in 10 cc. of pyridine and 2.5 cc. of methane-sulfochloride are added while cooling with ice. After standing over night at room temperature, the solution is stirred into 150 cc. of water and the brown precipitate is shaken out with methylene chloride. The methylene chloride is shaken through with 4 N-hydrochloric acid. After evaporation of the methylene chloride these remains a residue which is crystallized from acetone. There are obtained 640 grams of 5'-hydroxy-methyl-3'-keto-Δ⁴'-cyclopenteno-(1', 2':16,17)-Δ⁴-androstene-3-one mesylate of a melting point of 200° C.

We claim:

1. A compound selected from the group consisting of compounds of the formulae

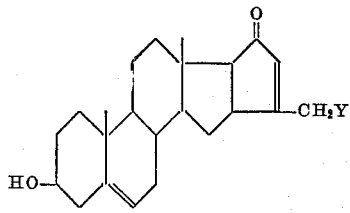

and

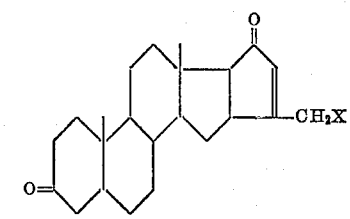

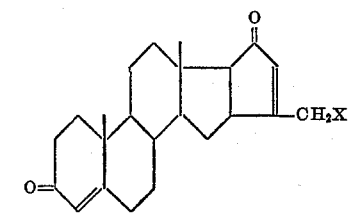

wherein X represents a member selected from the group consistign of hydrogen, hydroxy, acetoxy and mesyloxy and Y represents a member of the group consisting of hydrogen and hydroxy.

2. The compound of the formula

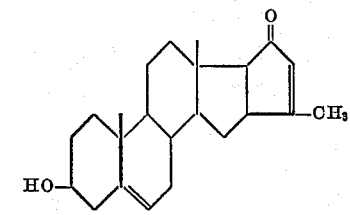

3. The compound of the formula

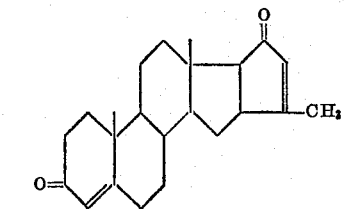

4. The compound of the formula

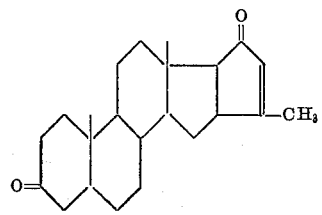

5. The compound of the formula

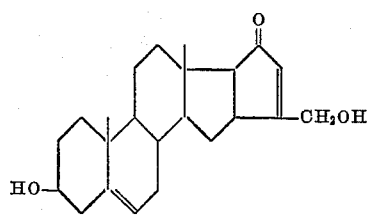

6. The compound of the formula

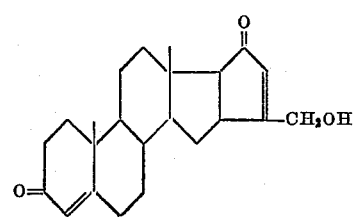

7. The compound of the formula

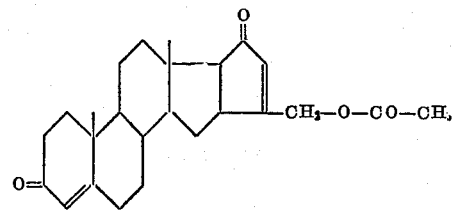

8. The compound of the formula

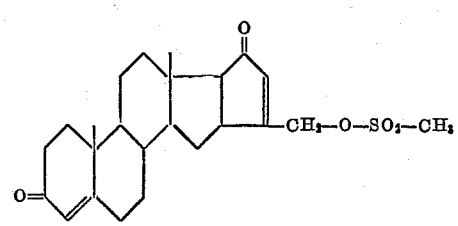

No references cited.